United States Patent Office.

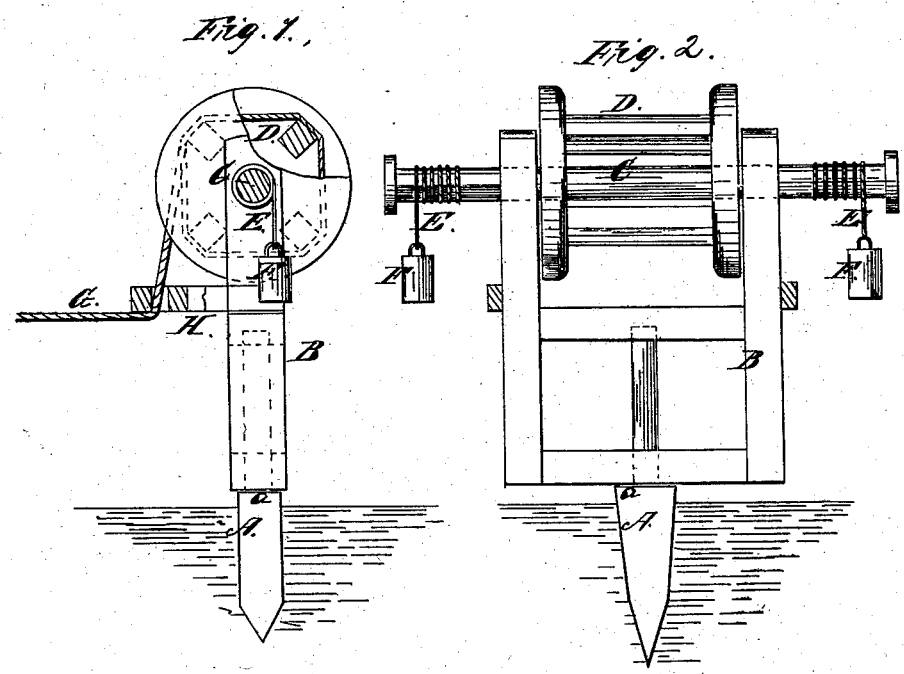

JAMES P. THORP, OF SOUTHINGTON, CONNECTICUT.

Letters Patent No. 66,417, dated July 2, 1867.

IMPROVEMENT IN DEVICE FOR TETHERING ANIMALS.

*The Schedule referred to in these Letters Patent and making part of the same.*

TO ALL WHOM IT MAY CONCERN:

Be it known that I, JAMES P. THORP, of Southington, in the county of Hartford, and State of Connecticut, have invented a new and improved Device for Tethering Animals; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to a new and improved device for tethering animals, designed more especially for horses, whereby said animals may be allowed a length of rope to admit of them grazing over a considerable area without danger of having their feet entangled in the rope. In the accompanying sheet of drawings—

Figure 1 is an end view of my invention.

Figure 2, a side view of the same.

Similar letters of reference indicate like parts.

A represents a stake, which is driven firmly in the ground and has its upper part turned or made of cylindrical form to receive a frame, B, which is allowed to turn freely on the upper part of the frame A, the turning down of the upper part of the stake leaving a shoulder, a, at its lower part on which the frame B rests, as shown clearly in fig. 2. The frame B is of rectangular form, and in its upper part a horizontal shaft, C, is fitted and allowed to turn freely, said shaft C having a reel, D, keyed or otherwise secured firmly upon it within the frame B. The shaft C projects through the sides of the frame B, and has two ropes, E E, attached to it, each rope having a weight, F, connected to it. To the reel D there is attached a halter-rope, G, which is wound upon the reel in a reverse direction to that in which the ropes E are wound upon the shaft C, so that when the halter-rope G is unwound from the reel D, the ropes E E will be wound upon the shaft C. The halter-rope G passes through a slot, b, in a board, H, attached to the frame B. This slotted board serves as a guide for the halter-rope G, preventing it from being drawn laterally off from the reel, and admitting of the rope turning the frame B on the stake A as the animal turns or walks around. The horse can pull the whole of the halter-rope G from the reel D, and walk and graze around in a circle of which the halter-rope G is the radius, the weights F taking up the slack whenever the horse approaches the stake A, by winding the rope on the reel by virtue of their own gravity. It is designed to have the slotted board H about three feet above the surface of the ground so that the rope G will not become entangled with the feet of the horse.

Having thus described my invention, I claim as new, and desire to secure by Letters Patent—

The frame B fitted on the stake A, so that it may turn loosely thereon, in combination with the shaft C fitted in the upper part of said frame, and having the reel D upon it with halter-rope G attached; the shaft C also having the ropes E E applied to it with weights F F at their ends, and all arranged substantially in the manner as and for the purpose set forth.

The above specification of my invention signed by me this 18th day of March, 1867.

JAMES P. THORP.

Witnesses:
H. R. BRADLEY,
EDWARD SCOTT.